Feb. 20, 1968  B. WEISSMAN ET AL  3,369,298
DENTAL HAND-PIECE AND TOOL THEREFOR
Filed March 28, 1966
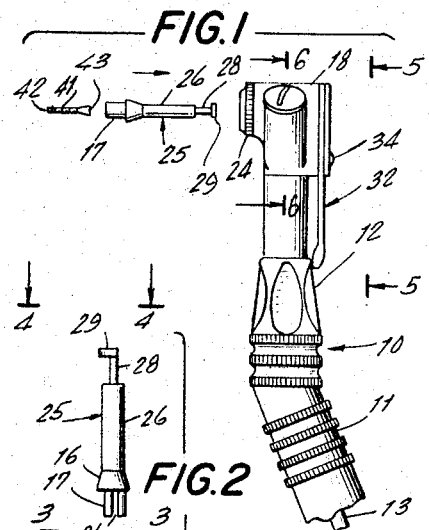
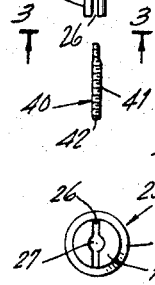
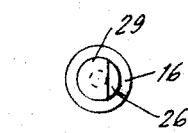
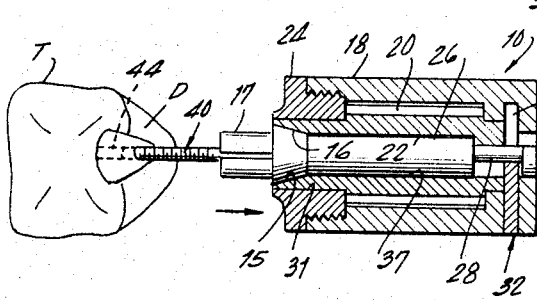
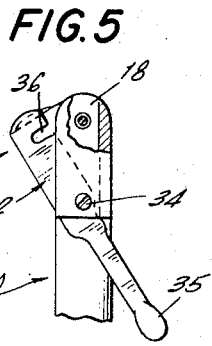
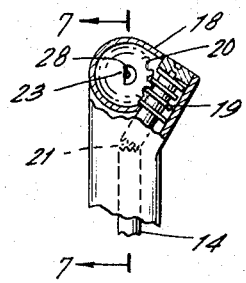
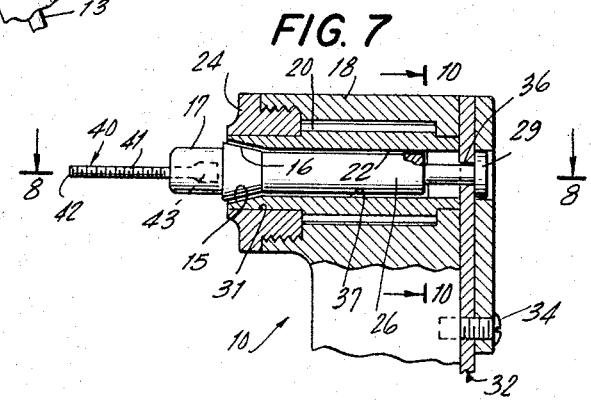
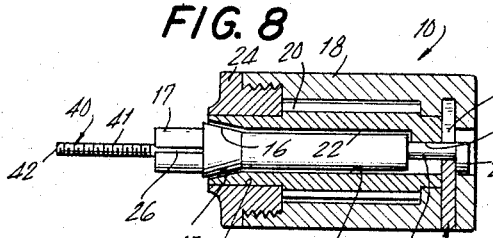
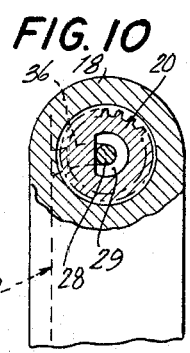
INVENTORS
BERNARD WEISSMAN
MORRIS COWAN
BY
Friedman & Goodman
ATTORNEYS

United States Patent Office 3,369,298
Patented Feb. 20, 1968

3,369,298
DENTAL HAND-PIECE AND TOOL THEREFOR
Bernard Weissman, Brooklyn, and Morris Cowan, New York, N.Y., assignors to Whaledent, Inc., Brooklyn, N.Y., a corporation of New York
Filed Mar. 28, 1966, Ser. No. 537,780
8 Claims. (Cl. 32—27)

ABSTRACT OF THE DISCLOSURE

This invention is directed to a tool holder member, particularly in combination with a dental hand-piece, in which clutch means are provided for cooperative rotational engagement with a dental tool member upon the application of hand pressure to the holder or hand-piece, one of said members having a counter-bore clutch portion and the other of said members having a clutch portion complementary to said counter-bore clutch portion.

---

The object of the present invention is to provide a highly novel and efficient dental tool for use with a dental handpiece. Other and further objects and advantages will be readily apparent to one skilled in the art from a consideration of the following specification taken in connection with the appended drawing.

In the drawing, which illustrates the best mode presently contemplated for carrying out the invention:

FIGURE 1 illustrates a dental handpiece of the contra-angle type embodying the present invention showing a tool in the process of being inserted therein;

FIGURE 2 is an elevational view of a dental tool in accordance with the present invention including a dental rod to be operated by the tool;

FIGURE 3 is a view on an enlarged scale taken along the line 3—3 of FIGURE 2;

FIGURE 4 is a view on an enlarged scale taken along the line 4—4 of FIGURE 2;

FIGURE 5 is a fragmentary view of the handpiece head when viewed in the direction of the arrows 5—5 of FIGURE 1 showing the tool lock in open position, portions being broken away for purposes of illustration;

FIGURE 6 is a sectional view of the handpiece taken along the line 6—6 of FIGURE 1;

FIGURE 7 is a sectional view of the handpiece with the tool in disengaged position therein taken along the line 7—7 of FIGURE 6;

FIGURE 8 is a sectional view taken along the line 8—8 of FIGURE 7;

FIGURE 9 is a view similar to FIGURE 8 showing the tool in engaged condition in the handpiece head; and FIGURE 10 is a sectional view taken on the line 10—10 of FIGURE 7.

FIGURES 1, 5 and 6 illustrate a contra-angle tool holder for a dental handpiece, which tool holder embodies the instant invention. The tool holder may be of generally conventional form as used in the practice of dentistry and is designated generally by the reference numeral 10. A contra-angle tool holder of the type to which the present invention pertains generally includes a coupling member 11 which is provided at one end with a tubular sleeve 12. The coupling member 11 is adapted to receive the chuck end of a dental handpiece which is not illustrated. The coupling member 11 mounts a drive shaft 13 which is gripped in the chuck of the handpiece so that it can be rotated by the dental engine. The coupling member 11 also mounts a coupling shaft 14 which is in operative connection and disposed at an angle with respect to the drive shaft 13 so as to be driven thereby. The coupling shaft 14 extends into the tubular sleeve 12. The sleeve is releasably locked to the coupling member in conventional fashion.

The tubular sleeve 12 is provided with a housing 18 which mounts a worm gear 19 and a pinion gear 20 which is driven by the worm gear. The coupling shaft 14 drives the worm gear 19 by means of companion meshed gears generally indicated by the reference numeral 21. As best shown in FIGURES 7, 8 and 9, the pinion gear 20 is provided with a hollow core 22. The core is substantially cylindrical in conformation and is provided at one end thereof with a ledge 23. Pursuant to a highly novel feature of the present invention, the core is provided at the other end thereof with a counter-bore 15. The pinion gear 20 is retained in position within the housing 18 by means of a threaded nut 24 which is releasably engaged within the housing.

Pursuant to the present invention, there is provided a tool which, as here shown, is in the form of a wrench and which is generally indicated by the reference numeral 25. The wrench is provided with a body portion 26 which is provided at one end thereof with an outwardly flared portion 16 and a cylindrical portion 17 which extends from the enlarged end of the outwardly flared portion. As best shown in FIGURES 2 and 3, the projecting cylindrical portion 17 is provided with a transverse slit 26 which extends longitudinally thereof. The slit is provided with a central bore or aperture 27 which extends longitudinally thereof. At the other end thereof, the tool body 26 is provided with an elongated neck 28 which mounts an eccentric head 29. The body portion 26 is generally of cylindrical conformation from the neck 28 to the outwardly flared portion 16. It will be noted that the outwardly flared portion 16 has a conformation which is complementary to the counter-bore 15 provided in the pinion gear 20.

The nut 24 is provided with a central aperture 31 into which the pinion gear 20 extends as best shown in FIGURES 7, 8 and 9. More particularly, it will be noted that the counter-bore portion 15 of the pinion gear 20 is readily accessible within the aperture 31 provided in the nut 24. It will be understood that the tool or wrench 25 may be inserted into the hollow passageway or core 22 of the pinion gear 20 by grasping the drill 25 and inserting the head 29 thereof directly into the counter-bored portion 15 of the pinion gear 20. The eccentric head 29 must be rotated so as to clear the ledge 23 as shown in FIGURE 8. Thereafter, the tool 25 may be rotated so that the eccentric head 29 is positioned relative to the ledge 23 so as to prevent the inadvertent disengagement of the tool from the pinion gear. In order to lock the tool in the pinion gear, provision is made for the lock 32. The lock 32 is pivotally mounted in a slot 33 defined in the housing 18. The pivot for the lock 32 is constituted by a pivot screw 34. The lock 32 is provided with a fingerpiece 35 whereby it may be pivotally moved from its operative locking position to its inoperative disengaged position as shown in FIGURE 3. The lock 32 is provided with a locking slot 36 which is adapted to engage neck 28 of the tool 25 as best shown in FIGURES 7, 8 and 9. It will be understood that the engagement of the neck 28 in the locking slot 36 does not prevent movement of the neck 28 transversely of the lock 32. More specifically, the wrench 25 is movable to and from the engaged or operative position thereof illustrated in FIGURE 9 and the disengaged or inoperative position thereof shown in FIGURES 7 and 8.

In the disengaged position of the wrench shown in FIGURES 7 and 8, it will be noted that the flared portion 16 of the wrench 25 is not seated fully in the complementary counter-bored portion 15 of the pinion gear 20. More specifically, it will be noted that there is a clearance or space generally indicated by the reference numeral 37 between the external surface of the wrench 25 and the complementary surface of the bore 22 in the pinion gear. As a result, the rotation of the pinion gear will not result in the rotation or operation of the wrench 25. It will be noted that in said position of the wrench, the outwardly flared portion 16 projects outwardly from the counter-bored portion 15 of the pinion gear and that the eccentric head 29 is seated on or engaged with the locking member 32. This, of course, prevents the inadvertent displacement of the wrench from the pinion gear. However, when the wrench is moved fully into the pinion gear in the direction indicated by the arrow 38 in FIGURE 9, the wrench will be fully seated in the pinion gear so as to eliminate the clearance 37. In said latter or operative condition of the wrench, the flared portion 16 thereof is fully seated in the counter-bored portion 15 of the pinion gear and does not project therefrom. However, the eccentric head 29 is displaced from the locking member 32 so as to provide a clearance 39 therebetween. The foregoing provides a highly advantageous clutch action as hereinafter described in detail.

As here shown, the wrench 25 is especially adapted to operate a rod 40 of the type fully illustrated and described in my co-pending application Ser. No. 455,259 filed May 12, 1965. The rod 40 is particularly adapted to be used for building superstructures on broken or undermined dentition. The reinforcing or anchor rod 40 is preferably formed of stainless steel and is provided with a self-threading body portion 41. One end of the body portion 41 is provided with a bevel end 42 and the other end is provided with an anchor head 43. The anchor head is outwardly flared and ridged as fully illustrated and described in said co-pending application. In order to engage the anchor rod 40 in the wrench 25, the body portion 41 thereof is grasped between the fingers and the flared anchor portion is inserted into the slit 26 in the cylindrical portion 17 of the wrench body and is urged upwardly therein with the body portion 41 of the anchor rod extending into the bore 27 in the wrench. In this manner, the anchor rod is both frictionally engaged and centered in the wrench. There is illustrated a tooth T which is to be provided with a superstructure or dentition D in the manner illustrated and described in my co-pending application. As therein described, a suitable channel 44 is first drilled into the tooth T for the reception of a rod 40 therein. The self-threading rod 25 may be threaded into the channel 44 by the rotation of the wrench 25 by means of the tool holder 10. As soon as the rod 40 engages the tooth T, it will be apparent that the movement of the tool 25 in the direction of the tooth T will cause the tool to move into the tool holder as indicated by the arrow 38. This will result in a clutching action which will eliminate the clearance 37 so that the tool will be fully seated in the hollow core 22 in the pinion gear 20, the outwardly flared portion 16 of the tool being seated in the counter-bored portion 15 of the pinion gear. It will be apparent that this results from the pressure of the tool holder 12 applied in the direction of the tooth T during the operation. As a result, the tool or wrench 25 is clutched in the tool holder and the rod is rotated for insertion into the channel 44 in the tooth. At any point at which the pressure is relieved by the dentist, the tool holder will immediately retract from the tool, so that the respective parts are moved from the position thereof shown in FIGURE 9 to the inoperative position thereof shown in FIGURES 7 and 8. This results in a de-clutching action due to the fact that the tool is now displaced from the tool holder to provide the previous clearance 37 so that the tool immediately ceases to rotate as soon as the pressure is removed. As a result, the dentist has complete, sensitive and immediate control of the complete operation of inserting the anchor rod 40 in the tooth T and he can immediately discontinue, as desired, the rotation or insertion of the rod into the tooth as required or as desired.

Although the invention has been illustrated and described in connection with a tool in the form of a wrench, it will be understood that it may be applied with advantage to many other forms of dental tools such as dental burrs or the like or dental drills or the like.

It will be noted that the tool may be readily withdrawn from the tool holder when desired by merely pivoting the lock 32 to the inoperative position thereof shown in FIGURE 5 so as to disengage the lock from the tool. In the event that the tool head 29 does not clear the ledge 23, the cylindrical portion 27 of the tool may be grasped and rotated so that the head will clear the ledge and the tool may then readily be withdrawn from the housing.

It will be understood that various changes and modifications may be made within the foregoing invention without, however, departing from the basic inventive concept thereof as set forth in the appended claims.

What is claimed is:

1. A tool holder for a dental handpiece comprising a housing, a driven gear mounted within said housing, said gear having a hollow core for receiving a dental tool, and counter-bore clutch means provided on said gear to provide a clutch operation with said tool.

2. A tool holder as in claim 1, said counter-bore clutch means being a counter-bore provided at one end of said hollow core.

3. A tool holder as in claim 2, said housing having a closed end and an opposing open end, and said counter-bore portion being disposed at the open end of said housing.

4. In combination, a tool holder for a dental handpiece and a tool member mounted by said holder, said holder comprising a housing and a driven gear member mounted in said housing, said gear having a hollow core, said tool member being mounted in said core, one of said members having a counter-bore clutch portion and the other of said members having a clutch portion complementary to said counter-bore clutch portion.

5. The combination as in claim 4, said gear member core having a counter-bore, and said tool member having a flared portion complementary to said counter-bore.

6. The combination as in claim 5, said tool member having a wrench portion extending outwardly from said flared portion.

7. The combination as in claim 6, said wrench portion having a transverse longitudinal bore defined in said slit.

8. The combination as in claim 4, and means for releasably locking said tool member in said core, said releasable locking means having means allowing limited relative axial movement of said tool member within said core.

References Cited

UNITED STATES PATENTS 2,866,530 12/1958 Charlat ———————— 192—67
3,314,153 4/1967 Maurer ———————— 32—27

LOUIS G. MANCENE, *Primary Examiner.*

C. R. WENTZEL, *Assistant Examiner.*